United States Patent [19]
Kuwata et al.

[11] Patent Number: 5,874,538
[45] Date of Patent: Feb. 23, 1999

[54] PROCESS FOR PRODUCING SOYBEAN PROTEIN

[75] Inventors: Gorou Kuwata, Yokosuka; Masatake Imai, Tanashi; Naoko Murayama, Yokohama, all of Japan

[73] Assignee: Morinaga & Co., Ltd., Tokyo, Japan

[21] Appl. No.: 732,555

[22] Filed: Oct. 15, 1996

[30] Foreign Application Priority Data

Oct. 31, 1995 [JP] Japan ................................. 7-306941

[51] Int. Cl.⁶ ....................................................... A23J 1/14
[52] U.S. Cl. ..................... 530/378; 426/472; 426/489; 426/507; 426/44
[58] Field of Search ........................... 530/378; 426/472, 426/489, 507, 430, 44

[56] References Cited

U.S. PATENT DOCUMENTS

| 2,732,395 | 1/1956 | Bolley | 260/461 |
|---|---|---|---|
| 4,072,670 | 2/1978 | Goodnight | 260/123.5 |
| 4,088,795 | 5/1978 | Goodnight | 426/598 |
| 4,375,431 | 3/1983 | Bradford | 260/123.5 |
| 4,435,438 | 3/1984 | Lehnhardt | 426/656 |
| 4,697,004 | 9/1987 | Puski | 530/378 |
| 5,270,450 | 12/1993 | Westfall | 530/378 |
| 5,658,714 | 8/1997 | Westfall | 530/378 |

OTHER PUBLICATIONS

Scopes, "Protein Purification" (Springer–Verlag) pp. 39–52, 1982.

Masatake, et al., "Production of Soybean Protein Having Mineral Absorbefacient Effect," English abstract of Japanese Patent Application Laid–Open No. 7-227215, Aug. 29, 1995.

Masatake, et al., "Mineral Absorbefacient and Food Comprising the Same," English abstract of Japanese Patent Application Laid–Open No. 7-228540, Aug. 29, 1995.

"Process for Producing Soybean Protein," English abstract of Japanese Patent Application Laid–Open No. 8-173052, Jul. 9, 1996.

"Phytate–Protein Interactions in Soybean Extracts and Low–Phytate Soy Protein Products," by Rham, et al., *Journal of Food Science*, 596 vol. 44, No. 2 (1979).

"Estrogenic Activity of Isoflavone Derivatives Extracted and Prepared from Soybean Oil Meal," Chang, et al., *Science*, vol. 118, 1953, pp. 164–165.

"Oestrogenic Activity of Subterranean Clover," Biggers, et al., *Biochem. J.*, vol. 58, 1954, pp. 278–282.

*Dairy Council Digest*, vol. 60, No. 3, May–Jun. 1989, Lois D. McBean, M.S., R.D.

*Primary Examiner*—Cecilia J. Tsang
*Assistant Examiner*—David Lukton
*Attorney, Agent, or Firm*—Beveridge, DeGrandi, Weilacher & Young, LLP

[57] ABSTRACT

A process for producing soybean protein comprising the step of adding to a soybean protein-containing raw material an aqueous solution of 0.05 to 3.0% by weight of an inorganic salt to form a suspension, causing soybean protein to dissolve in the suspension with adjustment of the pH thereof to 7.5 to 9.0 to form a suspension extract, and removing insoluble components from the suspension extract to obtain an extract; the step of subjecting the extract to acid precipitation with adjustment of the salt concentration thereof to from 0.2 to 1.0% by weight and the pH thereof to 5.0 to 5.7, to collect an acid precipitate; and the step of washing carried out at least once by adding water or an aqueous solution of not more than 1.0% by weight of an inorganic salt to the acid precipitate to form a dispersion, and stirring the dispersion with adjustment of the pH thereof to from 5.0 to 5.7, to collect a precipitate. In place of the washing step, the precipitate obtained by the acid precipitation may be again dissolved to again make acid precipitation.

As an advantage of the process, phytic acid and salts thereof can be efficiently removed even when extracted using an aqueous inorganic salt solution with a very low concentration.

7 Claims, No Drawings

PROCESS FOR PRODUCING SOYBEAN PROTEIN

FIELD OF THE INVENTION

This invention relates to a process for producing soybean protein from soybean protein-containing raw materials by extracting the soybean protein therefrom with use of an aqueous inorganic salt solution having a relatively low concentration, and efficiently removing phytic acid and salts thereof from the resulting extract without desalting to obtain a soybean protein having the phytic acid and salts thereof in a low content.

BACKGROUND OF THE INVENTION

At present, people in some developed countries are well nourished, and said to be almost free from nutrient deficiency diseases. However, according to national nutrition examinations made every year in Japan, only calcium is not sufficiently taken with respect to the necessary intake. In order to supplement such an insufficient intake of calcium, it is on the one hand recommended to ingest calcium supply food such as dairy products, small fish and seaweeds, and on the other hand energetically attempted to develop various types of calcium preparations and calcium enriched food.

Many of minerals including calcium, however, are commonly sparingly absorptive, and hence mere enrichment of minerals in food can not be effective for a sufficient supply of minerals. Also, food enriched in only one kind of mineral may competitively inhibit absorption of other minerals, and rather has a possibility of causing a deficiency of minerals, as pointed out in a report (Science of Food, the November, 1989 Issue, pages 8–16).

Hence, in recent years, research and development has been carried out on various absorption promotors that promote absorption of minerals tending to be insufficiently taken, in particular, calcium. For example, casein phosphopeptide (CPP), which is a phosphoserine-containing peptide having about 20 amino acid units, is known to prohibit the insolubilization of calcium in the digestive organs to promote the absorption of calcium.

The CPP, however, is contained in casein only in an amount of about 1/50 of casein, and has had the problem that it is very expensive. The CPP is also a peptide having about 20 amino acid units. Hence, it has a possibility that its molecular structure necessary for the solubilization of calcium is destroyed when digested by proteolytic enzymes contained in gastric juice and intestinal juice and consequently no intended effect can be obtained.

Meanwhile, soybean protein is a protein composed chiefly of globulins such as 11S, 7S and 2.8S, and, different from β-casein, contains almost no phosphoserine having a phosphoric acid group. Also, soybean protein contains phytic acid and salts thereof in a reasonable quantity. Such phytic acid and salts thereof are known to inhibit the intracorporeal absorption of minerals, in particular, of calcium (Toshiro Hayakawa, The First Niigata Prefecture Food Biotechnology Social Meeting, Separate Volume, 1989). As evidence therefor, it is reported that a comparative test made in respect of CPP and separated soybean protein to examine their calcium absorption promotion effect revealed that the CPP showed an apparent absorption of 60% but the separated soybean protein about 30% (Japan Nutrition Food Society, 45 (4) 333, 1992).

It is also reported that the phytic acid and salts in soybean protein can be removed to a content of as small as 0.14% by extracting soybean protein from a soybean protein-containing raw material with use of, e.g., a 8.5% by weight brine, and treating the resulting extract using an ultrafiltration membrane (Rham and Jost, J. Food Sci. 44 (2) 596, 1979).

In relation to the above finding, the present inventors have undertaken research on the phytic acid and salts thereof contained in soybean protein. In the course of the research, they have discovered that the phytic acid and salts thereof can be efficiently removed from a soybean protein-containing raw material by precipitation utilizing a calcium salt and/or a magnesium salt and electrodialysis, used in combination, and the soybean protein thus obtained, having the phytic acid and salts thereof in a low content, well effectively promotes the absorption of minerals. In this regard, they have filed patent applications, having been laid open as Japanese Patent Applications Laid-open No. 7-227215 and No. 7-228540.

However, when attempts have been made to obtain from soybean protein-containing raw materials soybean protein having a low level of phytic acid, difficulty has been encountered in removing the phytic acid. For example, in the above report by Rham and Jost, it is stated that phytic acid and salts thereof are removed when the brine is in a salt concentration of 8.5% but are not well removed when it is in a salt concentration of 7%. Thus, it is difficult to do so in the case when the brine (an extracting medium) has a low salt concentration. However, such extraction with a salt solution having a high concentration has the problem that it takes a long time for desalting and makes productivity poor, resulting in a high production cost.

Accordingly, the present inventors made further researches, and have discovered a process for producing soybean protein by extracting soybean protein from a soybean protein-containing raw material with use of an aqueous inorganic salt solution having a concentration not less than 1.0% by weight and less than 7.5% by weight, and subjecting the resulting extract to desalting by electrodialysis or ultrafiltration, followed by removal of phytic acid and salts thereof by isoelectric point precipitation. In this regard, they have filed a patent application as Japanese Patent Application No. 6-337321 (Japanese Patent Application Laid-open No. 8-173052).

According to the above process, even when the extracting medium has a relatively low salt concentration, the phytic acid and salts thereof can be well removed by the combination of electrodialysis or ultrafiltration with isoelectric point precipitation, and the desalting can be carried out in a shorter time. Hence, a soybean protein having phytic acid and salts thereof in a low content can be obtained while enjoying an economical advantage.

The above process enables extraction with a medium having a low salt concentration. However, it still requires the desalting treatment such as electrodialysis or ultrafiltration, and has had a problem of requiring plant investment therefor and treatment cost. Also, even though the salt concentration can be relatively low, there has been the problem that in an instance where bean-curd refuse, which is a residue formed after extraction of soybean protein from a soybean protein-containing raw material, is utilized as feed or the like the residue still has a high salt concentration and the salt must be removed.

SUMMARY OF THE INVENTION

The present invention was made taking account of the problems discussed above. Accordingly, an object of the present invention is to provide a process for producing soybean protein, that can produce a soybean protein having phytic acid and salts thereof in a low content, without requiring any desalting treatment such as electrodialysis or ultrafiltration, whereby plant investment and treatment cost can be reduced and also extraction residues from soybean protein-containing raw materials can be used in feed or the like as they are, without any operation to remove salts.

To achieve the above object, according to an embodiment of the present invention, the process for producing soybean protein comprises the steps of;

extraction carried out by adding to a soybean protein-containing raw material an aqueous solution of from 0.05% by weight to 3.0% by weight of an inorganic salt to form a suspension, causing soybean protein to dissolve in the suspension with adjustment of the pH thereof to from 7.5 to 9.0 to form a suspension extract, and removing insoluble components from the suspension extract to obtain an extract;

acid precipitation treatment carried out by subjecting the extract to acid precipitation with adjustment of the salt concentration thereof to from 0.2% by weight to 1.0% by weight and the pH thereof to from 5.0 to 5.7, to collect an acid precipitate; and washing carried out at least once by adding water or an aqueous solution of not more than 1.0% by weight of an inorganic salt to the acid precipitate to form a dispersion, and stirring the dispersion with adjustment of the pH thereof to from 5.0 to 5.7, to collect a precipitate.

According to another embodiment of the present invention, the process for producing soybean protein comprises the steps of;

extraction carried out by adding to a soybean protein-containing raw material an aqueous solution of from 0.05% by weight to 3.0% by weight of an inorganic salt to form a suspension, causing soybean protein to dissolve in the suspension with adjustment of the pH thereof to from 7.5 to 9.0 to form a suspension extract, and removing insoluble components from the suspension extract to obtain an extract;

first acid precipitation treatment carried out by subjecting the extract to acid precipitation with adjustment of the salt concentration thereof to from 0.2% by weight to 1.0% by weight and the pH thereof to from 5.0 to 5.7, to collect an acid precipitate; and second acid precipitation carried out by adding to the acid precipitate an aqueous solution of from 0.2% by weight to 1.0% by weight of an inorganic salt to form a dispersion, causing soybean protein to again dissolve in the dispersion with adjustment of the pH thereof to from 7.5 to 9.0 to form a solution, and again subjecting the solution to acid precipitation with adjustment of the pH thereof to from 5.0 to 5.7, to collect a precipitate.

DESCRIPTION OF THE PREFERRED EMBODIMENTS

In the present invention, when soybean protein is extracted from a soybean protein-containing raw material, an aqueous solution of 0.05 to 3.0% by weight of an inorganic salt is used to form a suspension, and soybean protein is caused to dissolve in the suspension, adjusting its pH to 7.5 to 9.0, to form a suspension extract, whereby part of phytic acid and salts thereof in the suspension extract can be insolubilized and precipitated. This suspension extract may be solid-liquid separated by a conventional means to obtain an extract from which the phytic acid and salts thereof has been partly removed.

Subsequently to the above step, the extract obtained is, after its salt concentration is adjusted to 0.2 to 1.0% by weight and its pH to 5.0 to 5.7, subjected to acid precipitation (isoelectric point precipitation), and the precipitate formed is collected, whereby the phytic acid and salts thereof remaining in the extract can be further removed efficiently.

Next, to the acid precipitate thus obtained, water or an aqueous solution of not more than 1.0% by weight of an inorganic salt is added and the dispersion formed is stirred after its pH is adjusted to 5.0 to 5.7, and the precipitate formed is collected; this step being carried out at least once (the first embodiment). Alternatively, to the precipitate formed by acid precipitation, an aqueous solution of 0.2 to 1.0% by weight of an inorganic salt is added to form a dispersion, and soybean protein is caused to dissolve in the dispersion, adjusting its pH to 7.5 to 9.0, and thereafter the solution formed is, after its PH is adjusted to 5.0 to 5.7, again subjected to acid precipitation, and the precipitate formed is collected (the second embodiment), whereby the phytic acid and salts thereof remaining therein can be further removed thoroughly. Thus, a soybean protein having phytic acid and salts thereof in a very low content, or substantially free of them, can be produced.

In this way, according to the present invention, it is unnecessary to provide the step of desalting such as electrodialysis or ultrafiltration, and hence, no special equipment for the desalting is required, making the production easy and the production cost lower, also bringing about economical advantage.

Since the aqueous inorganic salt solution with a concentration of as low as 0.05 to 3.0% by weight is used when soybean protein is extracted from soybean protein-containing raw materials, extraction residues such as beancurd refuse can be utilized in feed or the like as they are, without any operation to remove salts.

The soybean protein thus obtained, having phytic acid and salts thereof in a very low content, or substantially free of them, has a mineral absorption promotion effect superior to that of casein.

According to the present invention, the phytic acid and salts thereof can be removed without affecting the amino acid composition of the soybean protein itself and the content of various effective components such as isoflavon derivatives originally contained in soybeans.

There is a report that isoflavon derivatives, in particular, genistein and genistin contained in soybeans have physiological activities like female hormone estrogen (Cheng et al., Science 118, 164, 1953; Brigger et al., Biochem. J. 58, 278, 1954), and are known to have an effect of, e.g., prohibiting dissolution of born salt.

Hence, the product obtained by the production process of the present invention can be expected to have not only the mineral absorption promotion effect but also various physiological activities such as estrogenic effect which are inherent in soybeans.

In the present invention, there are no particular limitations on the soybean protein-containing raw material, and various types of raw materials may be used, as exemplified by defatted soybean powder, concentrated soybean protein, separated soybean protein, and soybean milk. These raw materials may be any of those commercially available and those prepared from raw material soybeans. The soybean protein-containing raw materials may preferably be those causing less denaturation, stated specifically, those having a denaturation rate (soluble nitrogenation rate) of NSI (nitrogen solubility index) 80 or above. Use thereof enables improvement in the rate of extraction of proteins.

As the aqueous inorganic salt solution added to the above raw material, an aqueous inorganic salt solution with a salt concentration of 0.05 to 3.0% by weight is used. If the aqueous inorganic salt solution has a salt concentration lower than 0.05% by weight, the soybean protein may be less effectively extracted from the raw material. A concentration higher than 3.0% by weight, the extract to be subjected to acid precipitation carried out later must be diluted to a higher degree, and it becomes necessary to carry out desalting when extraction residues are utilized in feed or the like. Thus, such concentration outside the above range is not preferable.

As the inorganic salt, it is preferable to use an alkali metal salt selected from, e.g., sodium chloride, potassium chloride and sodium sulfate.

There are no particular limitations on the amount of the aqueous inorganic salt solution used for the extraction. Taking account of the yield, the production cost and so forth, the aqueous solution may preferably be used in an amount 5- to 20-fold by volume based on the volume of the soybean protein-containing raw material. There are no particular limitations also on extraction temperature and extraction time. Preferably, the extraction may be carried out at room temperature for about 0.5 to 1 hour.

The pH at the time of extraction is adjusted to 7.5 to 9.0. If the pH is lower than 7.5, the soybean protein may dissolve with difficulty, resulting in a poor extraction efficiency. If on the other hand the pH is higher than 9.0, there is the problem that amino acids partly undergo decomposition. Thus, such pH outside the above range is not preferable.

The solid-liquid separation of the extract after the extraction may be carried out by decantation, centrifugal separation, filtration or the like, without any particular limitations.

Next, the extract obtained is, after its salt concentration is adjusted to 0.2 to 1.0% by weight and its pH to 5.0 to 5.7, subjected to acid precipitation, and the precipitate formed is collected. If the salt concentration is lower than 0.2% by weight, the phytic acid and salts thereof may be less effectively removed. If on the other hand it is higher than 1.0% by weight, the yield of protein may become lower. In order to adjust the salt concentration within this range, the inorganic salt described above may be added or water may be added to dilute the extract.

If the pH is lower than 5.0, the phytic acid and salts thereof may be less effectively removed. If on the other hand it is higher than 5.7, the yield of protein may become lower. The adjustment of the pH may be made by, e.g., dropwise adding an acid solution such as hydrochloric acid solution.

The precipitate obtained by the acid precipitation is subjected to washing, or again subjected to acid precipitation (second acid precipitation) to thoroughly remove the remaining phytic acid and salts thereof.

The washing is carried out by adding water or an aqueous solution of not more than 1.0% by weight of an inorganic salt to the acid precipitate thus obtained, and the dispersion formed is stirred after its pH is adjusted to 5.0 to 5.7, and the precipitate formed is collected. This washing is carried out at least once, and may be optionally carried out twice or more. If the aqueous inorganic salt solution used in this step has a concentration higher than 1.0% by weight, part of the protein may be solubilized to make the yield of protein poor.

If the pH is lower than 5.0, the phytic acid and salts thereof may be less effectively removed. If on the other hand it is higher than 5.7, part of the protein may be solubilized to make the yield of protein poor. Thus, such pH outside the above range is not preferable. There are no particular limitations on the time for which the dispersion is stirred. It may preferably be stirred for 0.25 to 1.0 hour.

In the embodiment where the precipitate obtained by the acid precipitation is again subjected to acid precipitation, an aqueous solution of 0.2 to 1.0% by weight of an inorganic salt is added to the precipitate formed by the first acid precipitation, to form a dispersion, and soybean protein is caused to dissolve in the dispersion, adjusting its pH to 7.5 to 9.0. Thereafter, the second acid precipitation is carried out under the same conditions as in the first acid precipitation.

The soybean protein separated in this way may be dissolved in water or the like in an appropriate concentration so as to be used as a product as it is. From the viewpoint of the safety, flavor and so forth of products, it is preferable to add water to form a dispersion, cause the soybean protein to dissolve in the dispersion, adjusting the pH to 7.5 to 8.5, and thereafter, adjusting the pH of the resulting solution to 6.5 to 7.0, make the solution into powder as a product. There are no particular limitations on the method by which it is powdered, and methods such as freeze-drying and spray drying may be employed. When formed into products by any of the above methods, the soybean protein separated may preferably be heated at 102° to 120° C. for about 5 to 15 minutes so that the trypsin inhibitor causative of a problem in the digestion of soybean protein is deactivated in advance.

The soybean protein thus obtained is a rich protein and has a mineral absorption promotion effect. The mineral absorption promotion effect attributable to the soybean protein from which the phytic acid and salts thereof has been removed is detailed in Japanese Patent Applications Laid-open No. 7-227215 and No. 7-228540, previously noted as the patent applications filed by the present inventors.

Thus, the soybean protein obtained by the production process of the present invention may be orally taken as it is, or may be used as a material having the mineral absorption promotion effect and as a substitute for diary products, soybean milk or various vegetable proteins. For example, it may be used as additives to various drinks such as vegetable protein drinks, lactic acid drink, instant soup and soybean milk, confectionery such as chocolate, cakes and caramels, and various food including process food such as bread, bean curd, ham, sausage and hamburgers and processed marine products such as chikuwa fish paste and kamaboko fish paste. There are no limitations on the manner in which the product is added to food. It may be added in the form of an aqueous solution or in the form of powder, either of which may be used.

The present invention will be described below in greater detail by giving Examples and Comparative Examples. In the following Examples and Comparative Examples, commercially available defatted soybean flakes FUJI TAKARA-MAME (trade name; available from Fuji Oil Co., Ltd.; denaturation rate (soluble nitrogenation rate): NSI 80 or above) were used as the soybean protein-containing raw material. As the aqueous inorganic salt solution, a solution was used which was prepared by dissolving sodium chloride or potassium chloride in ion-exchanged water so as to be in the stated salt concentration.

The quantity of protein was measured by the Kjeldahl method (using an automatic nitrogen analyzer manufactured by Tecator Co.), and the quantity of phytic acid was measured by the Mohamed method.

EXAMPLE 1

In 90 kg of 1% by weight brine, 10 kg of defatted soybean flakes FUJI TAKARAMAME was suspended, and thereafter the suspension was stirred for 1 hour. Immediately after the stirring was started, 30 minutes after the stirring was started, and immediately before the stirring was completed, a 5N sodium hydroxide solution was used to adjust the pH of the suspension to 8.0, under the conditions of which the soybean protein was extracted to obtain a suspension extract.

Next, this suspension extract was centrifuged using a cage type centrifugal separator (manufactured by Kokusan Centrifugal Separator Co.). After relatively large insoluble residues such as bean-curd refuse were removed, the suspension was centrifuged at 4,000 rpm for 30 minutes using a batch type centrifugal separator J6-HC (trade name; manufactured by Beckman Co.) to remove fine insoluble residues, to obtain a soybean protein extract from which insoluble matter was completely removed. This extract had a protein recovery of 69.5% by weight based on the protein in the raw material defatted soybean flakes, where phytic acid and salts thereof were in a content of 2.51% by weight based on the protein in the extract.

Subsequently, to 100 parts by volume of the soybean protein extract thus obtained, 200 parts by volume of water was added to dilute the extract to $1/3$ so as to adjust the sodium chloride concentration of the dilute solution to 0.33% by weight, and a 5N hydrochloric acid solution was dropwise added little by little while slowly stirring the solution so as not to bubble, to thereby adjust its pH to 5.5, followed by stirring for 1 hour. After the stirring was completed, the resulting dilute solution was centrifuged at 4,000 rpm for 10 minutes using the same batch type centrifugal separator J6-HC as the above to obtain a soybean protein curd as an acid precipitate. This soybean protein curd had a protein recovery of 46.3% by weight based on the protein in the raw material defatted soybean flakes, where phytic acid and salts thereof were in a content of 0.41% by weight based on the protein in the soybean protein curd.

Subsequently, to the soybean protein curd thus obtained, sodium chloride and 300 parts by volume of water were added to form a dispersion in the same quantity and the same sodium chloride concentration of 0.33% by weight as the above dilute solution, and thereafter the pH of the dispersion was adjusted to 5.5 using a 5N hydrochloric acid solution to carry out washing with stirring for 1 hour by means of a homomixer. After the washing with stirring was completed, the resulting dispersion was centrifuged at 4,000 rpm for 10 minutes using the batch type centrifugal separator J6-HC to obtain a purified soybean protein curd as a precipitate. This purified soybean protein curd had a protein recovery of 46.1% by weight based on the protein in the raw material defatted soybean flakes, where phytic acid and salts thereof were in a content of 0.04% by weight based on the protein in the purified soybean protein curd.

Thereafter, to 100 parts by volume of the purified soybean protein curd, 10-fold amount 100 parts by volume of water was added, followed by stirring by means of a homomixer to form a uniform dispersion, and a 2N sodium hydroxide solution was dropwise added to the dispersion to adjust its pH to 8.0. After the purified soybean protein curd was completely dissolved, the pH of the solution obtained was again adjusted to 6.8 using a 5N hydrochloric acid solution, followed by freeze drying to obtain a soybean protein powder.

EXAMPLE 2

Soybean protein powder was obtained in the same manner as in Example 1 except that the 1% by weight brine used in the step of extracting soybean protein from the defatted soybean flakes was replaced with an aqueous 2% by weight potassium chloride solution, the concentration of the aqueous potassium chloride solution (the concentration upon dilution to $1/3$) was adjusted to 0.66% by weight and the 0.33% by weight brine used in the step of washing was replaced with an aqueous 0.66% by weight potassium chloride solution.

As the result, the extract formed by extraction of soybean protein with the aqueous 2% by weight potassium chloride solution from the defatted soybean flakes had a protein recovery of 66.4% by weight based on the protein in the raw material defatted soybean flakes, where phytic acid and salts thereof were in a content of 2.55% by weight based on the protein in the extract.

The soybean protein curd obtained by the acid precipitation had a protein recovery of 43.5% by weight based on the protein in the raw material defatted soybean flakes, where phytic acid and salts thereof were in a content of 0.19% by weight based on the protein in the soybean protein curd.

The purified soybean protein curd further obtained after the washing had a protein recovery of 42.2% by weight based on the protein in the raw material defatted soybean flakes, where phytic acid and salts thereof were in a content of 0.00% by weight based on the protein in the purified soybean protein curd.

EXAMPLE 3

Soybean protein powder was obtained in the same manner as in Example 1 except that the 1% by weight brine used in the step of extracting soybean protein from the defatted soybean flakes was replaced with 3% by weight brine, the sodium chloride concentration (the concentration upon dilution to $1/3$) in the step of acid precipitation was adjusted to 1% by weight and the sodium chloride concentration in the step of the washing with brine was also adjusted to 1% by weight.

As the result, the extract formed by extraction of soybean protein with the 3% by weight brine from the defatted soybean flakes had a protein recovery of 65.5% by weight based on the protein in the raw material defatted soybean flakes, where phytic acid and salts thereof were in a content of 2.21% by weight based on the protein in the extract.

The soybean protein curd obtained by the acid precipitation had a protein recovery of 37.6% by weight based on the protein in the raw material defatted soybean flakes, where phytic acid and salts thereof were in a content of 0.10% by weight based on the protein in the soybean protein curd.

The purified soybean protein curd further obtained after the washing had a protein recovery of 36.5% by weight based on the protein in the raw material defatted soybean flakes, where phytic acid and salts thereof were in a content of 0.00% by weight based on the protein in the purified soybean protein curd.

The foregoing Examples 1 to 3 are common to each other in that the extract is diluted to $1/3$ to carry out acid precipitation and the pH in the steps of acid precipitation and washing is adjusted to 5.5, and are different in that the aqueous solution used in the extraction is a 1% by weight brine, an aqueous 2% by weight potassium chloride solution and a 3% by weight brine, respectively, and brine is used in Examples 1 and 3 and an aqueous potassium chloride solution in Example 2 in the step of washing.

With regard to the extract, the soybean protein curd obtained through acid precipitation and the purified soybean protein curd obtained after the washing, obtained in Examples 1 to 3, the protein recovery based on the protein in the raw material defatted soybean flakes and the content of phytic acid and salts thereof in each protein are shown together in Table 1.

In the following Examples and Comparative Examples, too, the protein recoveries of extracts, soybean protein curds and purified soybean protein curds are meant to be recoveries based on the protein in the raw material defatted soybean flakes. The content of phytic acid and salts thereof is also meant to be the proportion thereof with respect to the weight of the protein contained in each of the extracts, soybean protein curds and purified soybean protein curds.

In Table 1, letter symbol "A" indicates protein recovery; and "B", content of phytic acid and salts thereof. The soybean protein curd is expressed as "acid precipitation, and the purified soybean protein curd as "washed product". The same applies hereinafter in Tables 2 to 5.

TABLE 1

|  | Example 1 | Example 2 | Example 3 |
|---|---|---|---|
| Extract concentration: | 1 wt. % NaCl | 2 wt. % KCl | 3 wt. % NaCl |
| Washing solution concentration: | 0.33 wt. % NaCl | 0.66 wt. % KCl | 1 wt. % NaCl |

|  | A (%) | B (%) | A (%) | B (%) | A (%) | B (%) |
|---|---|---|---|---|---|---|
| Extract: | 69.5 | 2.51 | 66.4 | 2.55 | 65.5 | 2.21 |
| Acid precipitate: | 46.3 | 0.41 | 43.5 | 0.19 | 37.6 | 0.10 |
| Washed product: | 46.1 | 0.04 | 42.2 | 0.00 | 36.5 | 0.00 |

As is seen from the results shown in Table 1, the protein recovery "A" decreases with an increase in salt concentration of extracts, but the content of phytic acid and salts thereof "B" also decreases, showing that phytin is removed in a good efficiency.

EXAMPLE 4

Soybean protein powder was obtained in the same manner as in Example 1 except that the pH in the steps of acid precipitation and washing was changed to 5.3. The aqueous solution used in the step of extracting soybean protein from the defatted soybean flakes was a 1% by weight brine.

As the result, the soybean protein extract from the defatted soybean flakes had a protein recovery of 68.2% by weight, where phytic acid and salts thereof were in a content of 2.55% by weight.

The acid precipitate, soybean protein curd had a protein recovery of 49.9% by weight, where phytic acid and salts thereof were in a content of 0.60% by weight.

The washed product, purified soybean protein curd had a protein recovery of 46.9% by weight, where phytic acid and salts thereof were in a content of 0.33% by weight.

EXAMPLE 5

Soybean protein powder was obtained in the same manner as in Example 4 except that the aqueous solution used in the step of extracting soybean protein from the defatted soybean flakes was replaced with a 2% by weight brine.

As the result, the soybean protein extract from the defatted soybean flakes had a protein recovery of 69.8% by weight, where phytic acid and salts thereof were in a content of 2.46% by weight.

The acid precipitate, soybean protein curd had a protein recovery of 47.7% by weight, where phytic acid and salts thereof were in a content of 0.36% by weight.

The washed product, purified soybean protein curd had a protein recovery of 45.9% by weight, where phytic acid and salts thereof were in a content of 0.005% by weight.

EXAMPLE 6

Soybean protein powder was obtained in the same manner as in Example 4 except that the aqueous solution used in the step of extracting soybean protein from the defatted soybean flakes was replaced with a 3% by weight brine and the pH in the step of washing was changed to 5.0.

As the result, the soybean protein extract from the defatted soybean flakes had a protein recovery of 65.4% by weight, where phytic acid and salts thereof were in a content of 2.19% by weight.

The acid precipitate, soybean protein curd had a protein recovery of 43.3% by weight, where phytic acid and salts thereof were in a content of 0.42% by weight.

The washed product, purified soybean protein curd had a protein recovery of 43.1% by weight, where phytic acid and salts thereof were in a content of 0.04% by weight.

The foregoing Examples 4 to 6 are different from each other in that the brine used in the extraction has a sodium chloride concentration of 1% by weight, 2% by weight and 3% by weight, respectively, and the pH in the steps of acid precipitation and washing is adjusted to 5.3 in Examples 4 and 5 and 5.0 in Example 6. The ⅓-diluted solution in the step of acid precipitation and the washing solution have a sodium chloride concentration of 0.33% by weight in Example 4, 0.66% by weight in Example 5 and 1% by weight in Example 6.

With regard to the extract, the acid precipitate (soybean protein curd) and the washed product (purified soybean protein curd), obtained in Examples 4 to 6 each, the protein recovery and the content of phytic acid and salts thereof are shown together in Table 2.

TABLE 2

|  | Example 4 | Example 5 | Example 6 |
|---|---|---|---|
| Extract salt concentration: | 1 wt. % | 2 wt. % | 3 wt. % |
| pH in acid precipitation and washing: | 5.3 | 5.3 | 5.0 |

|  | A (%) | B (%) | A (%) | B (%) | A (%) | B (%) |
|---|---|---|---|---|---|---|
| Extract: | 68.2 | 2.55 | 69.8 | 2.46 | 65.4 | 2.19 |
| Acid precipitate: | 49.9 | 0.60 | 47.7 | 0.36 | 43.3 | 0.42 |
| Washed product: | 46.9 | 0.33 | 45.9 | 0.005 | 43.1 | 0.04 |

As is seen from comparison between the results shown in Table 2 and the results shown in Table 1, the protein recovery tends to slightly increase with an increase in pH, but the content of phytic acid and salts thereof also tends to increase.

COMPARATIVE EXAMPLE 1

Soybean protein powder was obtained in the same manner as in Example 1 except that the 1% by weight brine used in the step of extracting soybean protein from the defatted soybean flakes was replace with water (NaCl concentration: 0% by weight), the extract was not diluted before the acid precipitation and the washing once with brine was replaced with washing twice with water. Since the extract was directly precipitated after the soybean protein was extracted from the defatted soybean flakes, the sodium chloride concentration in the step of acid precipitation was 0% by weight.

As the result, the soybean protein extract from the defatted soybean flakes had a protein recovery of 71.2% by weight, where phytic acid and salts thereof were in a content of 3.13% by weight.

The acid precipitate, soybean protein curd had a protein recovery of 40.2% by weight, where phytic acid and salts thereof were in a content of 0.92% by weight.

The purified soybean protein curd formed after washing once had a protein recovery of 37.7% by weight, where phytic acid and salts thereof were in a content of 0.55% by weight.

The purified soybean protein curd formed after washing twice had a protein recovery of 38.1% by weight, where phytic acid and salts thereof were in a content of 0.44% by weight.

EXAMPLE 7

Soybean protein powder was obtained in the same manner as in Example 1 except that the extract was not diluted before the acid precipitation and the washing once with brine was replaced with washing twice with water. The salt concentration of the brine in the steps of protein extraction and acid precipitation each was 1% by weight.

As the result, the soybean protein extract from the defatted soybean flakes had a protein recovery of 69.5% by weight, where phytic acid and salts thereof were in a content of 2.97% by weight.

The acid precipitate, soybean protein curd had a protein recovery of 25.5% by weight, where phytic acid and salts thereof were in a content of 0.61% by weight.

The purified soybean protein curd formed after washing once had a protein recovery of 23.5% by weight, where phytic acid and salts thereof were in a content of 0.10% by weight.

The purified soybean protein curd formed after washing twice had a protein recovery of 25.5% by weight, where phytic acid and salts thereof were in a content of 0.09% by weight.

COMPARATIVE EXAMPLE 2

Soybean protein powder was obtained in the same manner as in Example 1 except that the 1% by weight brine used in the step of extracting soybean protein from the defatted soybean flakes was replaced with 2% by weight brine and the extract with a sodium chloride concentration of 2% by weight was not diluted and subjected to acid precipitation as it was. As a result, it was impossible to precipitate soybean protein.

Incidentally, the extract obtained by extracting soybean protein from the defatted soybean flakes using the 2% by weight brine had a protein recovery of 66.0% by weight.

The foregoing Comparative Example 1, Example 7 and Comparative Example 2 are common to each other in that the extract is not diluted before the acid precipitation and the pH in the steps of acid precipitation and washing is adjusted to 5.5, and are different in that the sodium chloride concentration of the extract is adjusted to 0% by weight in Comparative Example 1, 1% by weight in Example 7 and 2% by weight in Comparative Example 2. Since the extracts are subjected to acid precipitation as they are, the sodium chloride concentration in the step of acid precipitation is 0% by weight, 1% by weight and 2% by weight, respectively.

With regard to the extract, the acid precipitate (soybean protein curd), the washed-once product (purified soybean protein curd) and the washed-twice product (purified soybean protein curd), obtained in Comparative Example 1, Example 7 and Comparative Example 2 each, the protein recovery and the content of phytic acid and salts thereof are shown together in Table 3.

TABLE 3

|  | Comparative Example 1 | | Example 7 | | Comparative Example 2 | |
| --- | --- | --- | --- | --- | --- | --- |
| Extract salt concentration: | 0 wt. % | | 1 wt. % | | 2 wt. % | |
|  | A (%) | B (%) | A (%) | B (%) | A (%) | B (%) |
| Extract: | 71.2 | 3.13 | 69.5 | 2.97 | 66.0 | — |
| Acid precipitate: | 40.2 | 0.92 | 25.5 | 0.61 | * | — |
| Washed-once product: | 37.7 | 0.55 | 23.5 | 0.10 | — | — |
| Washed-twice product: | 38.1 | 0.44 | 25.5 | 0.09 | — | — |

*No precipitation took place.

COMPARATIVE EXAMPLE 3, EXAMPLES 8 AND 9

Soybean protein powders of Comparative Example 3 and Examples 8 and 9 were obtained in the same manner as in Comparative Example 1, Example 7 and Comparative Example 2, respectively, except that the extracts were diluted with water to ⅓ in the step of acid precipitation. In Comparative Example 3, the extraction was carried out with water as in Comparative Example 1. In Example 8, the extraction was carried out with 1% by weight brine as in Example 7. In Example 9, the extraction was carried out with 2% by weight brine as in Comparative Example 2.

Since in Comparative Example 2 the precipitation did not take place in the step of acid precipitation, the subsequent steps were not taken. In Example 9, however, different from Comparative Example 2, the extract was diluted to a ⅓ sodium chloride concentration and an acid precipitate was formed. Accordingly, the washing was carried out twice as in Comparative Example 1 and Example 7.

The foregoing Comparative Example 3 and Examples 8 and 9 are common to each other in that the extract is diluted with water to ⅓ to carry out acid precipitation, the washing was carried out twice using water and the pH in the steps of acid precipitation and washing is adjusted to 5.5, and are different in that the sodium chloride concentration in the step of extracting soybean protein is adjusted to 0% by weight (water), 1% by weight or 2% by weight. The sodium chloride concentration of the dilute solution in the step of acid precipitation is 0% by weight in Comparative Example 3, 0.33% by weight in Example 8, and 0.66% by weight in Example 9.

With regard to the extract, the acid precipitate (soybean protein curd), the washed-once product (purified soybean protein curd) and the washed-twice product (purified soybean protein curd), obtained in Comparative Example 3 and Examples 8 and 9 each, the protein recovery and the content of phytic acid and salts thereof were measured in the same manner as in the previous examples to obtain the results shown in Table 4.

TABLE 4

|  | Comparative Example 3 | | Example 8 | | Example 9 | |
|---|---|---|---|---|---|---|
| Extract salt concentration: | 0 wt. % | | 1 wt. % | | 2 wt. % | |
|  | A (%) | B (%) | A (%) | B (%) | A (%) | B (%) |
| Extract: | 75.2 | 2.59 | 67.3 | 2.62 | 69.2 | 2.33 |
| Acid precipitate: | 45.7 | 0.67 | 40.6 | 0.41 | 38.7 | 0.19 |
| Washed-once product: | 45.0 | 0.45 | 39.8 | 0.33 | 37.7 | 0.13 |
| Washed-twice product: | 44.0 | 0.41 | 39.1 | 0.23 | 37.3 | 0.06 |

As is seen from the results shown in Tables 3 and 4, the protein recovery is more improved and the phytic acid content becomes lower, when the extract is diluted with water in the step of acid precipitation to lower its salt concentration. As is also seen therefrom, since no precipitate is formed when the salt concentration is 2% by weight in the step of acid precipitation, the salt concentration in the step of acid precipitation must be 1% by weight or less.

COMPARATIVE EXAMPLE 4, EXAMPLES 10 AND 11

Soybean protein powders of Comparative Example 4 and Examples 10 and 11 were obtained in the same manner as in Comparative Example 1, Example 7 and Comparative Example 2, respectively, except that the extracts were diluted with water to ⅕ in the step of acid precipitation. In Comparative Example 4, the extraction was carried out with water as in Comparative Example 1. In Example 10, the extraction was carried out with 1% by weight brine as in Example 7. In Example 11, the extraction was carried out with 2% by weight brine as in Comparative Example 2.

Since in Comparative Example 2 the precipitation did not take place in the step of acid precipitation, the subsequent steps were not taken. In Example 11, however, an acid precipitate was formed, and accordingly the washing was carried out twice as in Comparative Example 1 and Example 7.

The foregoing Comparative Example 4 and Examples 10 and 11 are common to each other in that the extract is diluted with water to ⅕ to carry out acid precipitation, the washing was carried out twice using water and the pH in the steps of acid precipitation and washing is adjusted to 5.5, and are different in that the sodium chloride concentration in the step of extracting soybean protein is adjusted to 0% by weight (water), 1% by weight or 2% by weight. The sodium chloride concentration of the dilute solution in the step of acid precipitation is 0% by weight in Comparative Example 4, 0.20% by weight in Example 10, and 0.40% by weight in Example 11.

With regard to the extract, the acid precipitate (soybean protein curd), the washed-once product (purified soybean protein curd) and the washed-twice product (purified soybean protein curd), obtained in Comparative Example 4 and Examples 10 and 11 each, the protein recovery and the content of phytic acid and salts thereof were measured in the same manner as in the previous examples to obtain the results shown in Table 5.

TABLE 5

|  | Comparative Example 4 | | Example 10 | | Example 11 | |
|---|---|---|---|---|---|---|
| Extract salt concentration: | 0 wt. % | | 1 wt. % | | 2 wt. % | |
|  | A (%) | B (%) | A (%) | B (%) | A (%) | B (%) |
| Extract: | 75.9 | 2.81 | 69.2 | 3.30 | 69.0 | 2.40 |
| Acid precipitate: | 48.2 | 0.65 | 47.1 | 0.43 | 43.5 | 0.30 |
| Washed-once product: | 48.8 | 0.49 | 47.5 | 0.32 | 43.6 | 0.24 |
| Washed-twice product: | 47.2 | 0.44 | 45.6 | 0.26 | 42.3 | 0.22 |

As is seen from comparison between the results shown in Table 5 above and the results previously shown in Table 4, the protein recovery increases with a decrease in salt concentration in the step of acid precipitation, but the content of phytic acid and salts thereof tends to increase.

COMPARATIVE EXAMPLE 5

The extraction of soybean protein and the first-time acid precipitation were carried out in the same manner as in Example 1 except that the 1% by weight brine used in the step of extracting soybean protein from the defatted soybean flakes was replace with water (NaCl concentration: 0% by weight).

Subsequently, to the soybean protein curd thus obtained, 300 parts by volume of water was added, and the former was uniformly dispersed in the latter by means of a homomixer, followed by addition of a 2N sodium hydroxide solution to adjust the pH to 8.0. After the soybean protein curd was completely dissolved (again dissolved), a 5N hydrochloric acid solution was dropwise added little by little while slowly stirring the solution so as not to bubble, to thereby adjust its pH to 5.5, followed by stirring which was continued for 1 hour. Thereafter, the solution obtained was centrifuged at 4,000 rpm for 10 minutes using the batch type centrifugal separator to obtain a purified soybean protein curd, the second-time acid precipitate.

The purified soybean protein curd thus obtained was formed into powder in the same manner as in Example 1 to obtain soybean protein powder.

The extract formed by extracting soybean protein from the defatted soybean flakes had a protein recovery of 72.6% by weight, where phytic acid and salts thereof were in a content of 2.76% by weight.

The soybean protein curd obtained by the first-time acid precipitation had a protein recovery of 45.0% by weight, where phytic acid and salts thereof were in a content of 0.69% by weight.

The purified soybean protein curd obtained by again dissolving the above soybean protein curd and carrying out the second-time acid precipitation had a protein recovery of 42.7% by weight, where phytic acid and salts thereof were in a content of 0.40% by weight.

EXAMPLE 12

The procedure similar to in Example 1 was taken up to the steps to extract soybean protein from the defatted soybean flakes using a 1% by weight brine and dilute the resulting extract to ⅓ to carry out first-time acid precipitation, to obtain a soybean protein curd. Since the extract was diluted to ⅓, the sodium chloride concentration in the step of acid precipitation was 0.33% by weight.

To the soybean protein curd thus obtained, sodium chloride and water were added so as to be in the same amount and sodium chloride concentration as those in the above dilute solution, i.e., to be 0.33% by weight, followed by second-time acid precipitation in the same manner as in Comparative Example 5 to obtain a purified soybean protein curd. This purified soybean protein curd was treated in the same manner as in Example 1 to obtain a soybean protein powder.

The extract formed by extracting soybean protein from the defatted soybean flakes using water had a protein recovery of 69.7% by weight, where phytic acid and salts thereof were in a content of 2.66% by weight.

The soybean protein curd obtained by the first-time acid precipitation had a protein recovery of 37.3% by weight, where phytic acid and salts thereof were in a content of 0.43% by weight.

The purified soybean protein curd obtained by the second-time acid precipitation had a protein recovery of 36.3% by weight, where phytic acid and salts thereof were in a content of 0.05% by weight.

EXAMPLE 13

Soybean protein powder was obtained in the same manner as in Example 12 except that the 1% by weight brine used in the step of extracting soybean protein from the defatted soybean flakes was replaced with an aqueous 2% by weight potassium chloride solution. Since the extract was diluted to ⅓ to carry out the first-time acid precipitation and sodium chloride and water were added so as to be in the same amount and concentration as those in the above dilute solution to carry out the second-time acid precipitation, the sodium chloride concentration in the step of each acid precipitation was 0.66% by weight.

The extract formed by extracting soybean protein from the defatted soybean flakes using water had a protein recovery of 69.2% by weight, where phytic acid and salts thereof were in a content of 2.54% by weight.

The soybean protein curd obtained by the first-time acid precipitation had a protein recovery of 37.3% by weight, where phytic acid and salts thereof were in a content of 0.25% by weight.

The purified soybean protein curd obtained by again dissolving the above soybean protein curd and carrying out the second-time acid precipitation had a protein recovery of 32.9% by weight, where phytic acid and salts thereof were in a content of 0.00% by weight.

The foregoing Comparative Example 5 and Examples 12 and 13 are common to each other in that the extract is diluted to ⅓ to carry out the first-time acid precipitation, sodium chloride and water were added to the resulting soybean protein curd so as to be in the same amount and concentration as those in the above dilute solution to carry out the second-time acid precipitation and the pH in the steps of the first- and second-time acid precipitation is adjusted to 5.5, and are different in that the salt concentration of the brine used in the step of extraction is adjusted to 0% by weight, 1% by weight and 2% by weight, respectively.

With regard to the extract, the first-time acid precipitate (soybean protein curd) and the second-time acid precipitate (purified soybean protein curd), obtained in Comparative Example 5 and Examples 12 and 13 each, the protein recovery and the content of phytic acid and salts thereof are shown in Table 6.

TABLE 6

|  | Comparative Example 5 | | Example 12 | | Example 13 | |
| --- | --- | --- | --- | --- | --- | --- |
| Extract salt concentration: | 0 wt. % | | 1 wt. % | | 2 wt. % | |
|  | A (%) | B (%) | A (%) | B (%) | A (%) | B (%) |
| Extract: | 72.6 | 2.76 | 69.7 | 2.66 | 69.2 | 2.54 |
| First-time acid precipitate: | 45.0 | 0.69 | 37.3 | 0.43 | 37.3 | 0.25 |
| Second-time acid precipitate: | 42.7 | 0.40 | 36.3 | 0.05 | 32.9 | 0.00 |

As is seen from the results shown in Table 6, the protein recovery increases with a decrease in salt concentration of the extract, but the content of phytic acid and salts thereof increases.

COMPARATIVE EXAMPLE 6, EXAMPLES 14 AND 15

Soybean protein powders of Comparative Example 6 and Examples 14 and 15 were obtained in the same manner as in Comparative Example 5, Examples 12 and 13, respectively, except that the pH in the steps of first- and second-time acid precipitation was changed to 5.0. In Comparative Example 5, in the step of extracting soybean protein from the defatted soybean flakes, water (NaCl concentration: 0% by weight) was used as in Comparative Example 5. In Example 14, a 1% by weight brine was used as in Example 12. In Example 15, a 2% by weight brine was used as in Example 13.

The foregoing Comparative Example 6 and Examples 14 and 15 are common to each other in that the extract is diluted to ⅓ to carry out the first-time acid precipitation, sodium chloride and water were added to the resulting soybean protein curd so as to be in the same amount and concentration as those in the above dilute solution to carry out the second-time acid precipitation and the pH in the steps of the first- and second-time acid precipitation is adjusted to 5.0, and are different in that the salt concentration of the brine used in the step of extraction is adjusted to 0% by weight, 1% by weight and 2% by weight, respectively.

With regard to the extract, the first-time acid precipitate (soybean protein curd) and the second-time acid precipitate (purified soybean protein curd), obtained in Comparative Example 6 and Examples 14 and 15 each, the protein recovery and the content of phytic acid and salts thereof are shown in Table 7.

TABLE 7

|  | Comparative Example 6 | | Example 14 | | Example 15 | |
| --- | --- | --- | --- | --- | --- | --- |
| Extract salt concentration: | 0 wt. % | | 1 wt. % | | 2 wt. % | |
|  | A (%) | B (%) | A (%) | B (%) | A (%) | B (%) |
| Extract: | 68.6 | 2.86 | 68.3 | 2.73 | 68.2 | 2.68 |
| First-time acid precipitate: | 58.9 | 1.29 | 54.8 | 0.93 | 52.0 | 0.71 |
| Second-time acid precipitate: | 56.5 | 1.20 | 52.8 | 0.73 | 48.9 | 0.42 |

As is seen from comparison between the results shown in Table 7 above and the results previously shown in Table 6, the protein recovery increases with a decrease in pH in the step of acid precipitation, but the content of phytic acid and salts thereof increases.

As is also seen from the results shown in Tables 1 to 7, in Examples 1 to 15 which are in accordance with the soybean protein production process of the present invention, the phytic acid and salts thereof can be efficiently removed while well maintaining the recovery of soybean protein, compared with Comparative Examples 1 to 6.

As described above, according to the present invention, the phytic acid and salts thereof can be efficiently removed even when soybean protein is extracted from soybean protein-containing raw materials, using the aqueous solution of an inorganic salt with a concentration of as low as 0.05 to 3.0% by weight. Also, it is unnecessary to carry out any desalting treatment such as electrodialysis or ultrafiltration. Hence, the soybean protein can be mass-produced in an industrial scale and equipment cost can be reduced, bringing about economical advantages. Since also the soybean protein can be extracted from soybean protein-containing raw materials using the aqueous inorganic salt solution with a low concentration, extraction residues such as bean-curd refuse can be used in feed or the like as they are. Also, the soybean protein from which phytic acid and salts thereof have been removed has a high mineral absorption promotion effect, and hence its use as mineral absorption promotors or food materials having a mineral absorption promotion effect is expected.

What is claimed is:

1. A process for isolating soybean protein that is substantially free from phytic acid and salts thereof comprising the steps of:
    (a) extracting soybean protein from a soybean protein containing raw material by mixing said raw material with an aqueous solution containing 0.05–3.0% (w/v) inorganic salt, and subsequently adjusting the pH to 7.5–9.0, thereby forming a suspension;
    (b) removing the insoluble components from said suspension to obtain an extract containing dissolved soybean protein;
    (c) precipitating soybean protein from said extract by adjusting the pH to 5.0–5.7 while maintaining the inorganic salt concentration in the range of 0.2–1.0% (w/v), and subsequently collecting the resulting acid precipitate;
    (d) washing the acid precipitate at least once by mixing the precipitate from step (c) with water or an aqueous solution of not more than 1% (w/v) inorganic salt and stirring the resulting dispersion; and
    (e) precipitating the soybean protein a second time by readjusting the pH to 5.0–5.7 and terminating the stirring process.

2. A process for isolating soybean protein that is substantially free from phytic acid and salts thereof comprising the steps of:
    (a) extracting soybean protein from a soybean protein-containing raw material by mixing said raw material with an aqueous solution containing 0.05–3.0% (w/v) inorganic salt, and subsequently adjusting the pH to 7.5–9.0, thereby forming a suspension;
    (b) removing the insoluble components from said suspension to obtain an extract containing dissolved soybean protein;
    (c) precipitating soybean protein from said extract by adjusting the pH to 5.0–5.7 while maintaining the inorganic salt concentration in the range of 0.2–1.0% (w/v), and subsequently collecting the resulting acid precipitate;
    (d) mixing the acid precipitate from step (c) with an aqueous solution containing 0.2–1.0% (w/v) inorganic salt followed by adjustment of the pH to 7.5–9.0, thereby forming a solution containing dissolved soybean protein; and
    (e) precipitating the soybean protein by lowering the pH of the solution obtained in step (d) to 5.0–5.7, followed by collection of the resulting precipitate.

3. The process of claim 1, wherein the inorganic salt concentration in step (c) is maintained in the range of 0.2–1.0% by adding salt to the extract when the salt concentration is lower than 0.2% or by adding water to the extract to dilute the extract when the salt concentration is higher than 1%.

4. The process of claim 1, further comprising the steps of:
    (f) mixing the precipitate obtained in step (e) with water;
    (g) adjusting the pH of the mixture obtained in step (f) to 7.5–8.5 to obtain a solution;
    (h) adjusting the pH of the solution of step (g) to 6.5–7.0, and removing the water from the resulting solution to yield a powder comprising soybean protein.

5. The process of claim 4, wherein the water is removed by freeze-drying or spray-drying the solution.

6. The process of claim 2, further comprising the steps of:
    (f) mixing the precipitate obtained in step (e) with water;
    (g) adjusting the pH of the mixture obtained in step (f) to 7.5–8.5 to obtain a solution;
    (h) adjusting the pH of the solution of step (g) to 6.5–7.0, and removing the water from the resulting solution to yield a powder comprising soybean protein.

7. The process of claim 6, wherein the water is removed by freeze-drying or spray-drying the solution.

* * * * *